US012749167B2

(12) United States Patent
Chen et al.

(10) Patent No.: US 12,749,167 B2
(45) Date of Patent: Sep. 29, 2026

(54) METHOD FOR ADJUSTING EXPOSURE PARAMETERS OF IMAGES TO BE SPLICED AND IMAGE ANALYZING DEVICE

(71) Applicant: ASPEED Technology Inc., Hsinchu City (TW)

(72) Inventors: Hsin-Hui Chen, Hsinchu City (TW); Hsin Yu Chen, Hsinchu City (TW)

(73) Assignee: ASPEED Technology Inc., Hsinchu City (TW)

( * ) Notice: Subject to any disclaimer, the term of this patent is extended or adjusted under 35 U.S.C. 154(b) by 323 days.

(21) Appl. No.: 18/740,538

(22) Filed: Jun. 12, 2024

(65) Prior Publication Data

US 2025/0336047 A1 Oct. 30, 2025

(30) Foreign Application Priority Data

Apr. 30, 2024 (TW) ................................. 113116116

(51) Int. Cl.
*G06T 3/4038* (2024.01)
*G06T 5/50* (2006.01)
*G06T 5/92* (2024.01)

(52) U.S. Cl.
CPC .............. *G06T 5/92* (2024.01); *G06T 3/4038* (2013.01); *G06T 5/50* (2013.01)

(58) Field of Classification Search
CPC ........... G06T 5/92; G06T 5/50; G06T 3/4038; H04N 23/698; H04N 23/71
See application file for complete search history.

(56) References Cited

U.S. PATENT DOCUMENTS

2014/0267593 A1* 9/2014 Kim ...................... G06T 3/4038 348/36
2018/0115694 A1* 4/2018 Choi ...................... H04N 23/70
2020/0396363 A1* 12/2020 Wang ..................... H04N 23/73
2021/0366089 A1* 11/2021 Shen ......................... G06T 5/50

FOREIGN PATENT DOCUMENTS

CN 101064783 10/2007
CN 104125410 10/2014
CN 108377345 8/2018
CN 109361855 2/2019
CN 110049257 9/2021
CN 113706375 11/2021
CN 111741228 7/2022

OTHER PUBLICATIONS

"Office Action of Taiwan Counterpart Application", issued on Oct. 16, 2024, p. 1-p. 10.

* cited by examiner

*Primary Examiner* — Carol W Chan
(74) *Attorney, Agent, or Firm* — JCIPRNET

(57) ABSTRACT

A method for adjusting exposure parameters of images to be spliced and an image analyzing device are provided. The method includes: obtaining N images to be spliced into a panoramic image; obtaining a first brightness value of a first overlapping area and a second brightness value of a second overlapping area of each of the N images, and accordingly determining a first brightness ratio value and a second brightness ratio value of each of the N images; and determining a brightness ratio difference of each of the N images based on the first brightness ratio value and the second brightness ratio value of each of the N images, and accordingly updating an exposure parameter corresponding to each of the N images.

12 Claims, 5 Drawing Sheets

METHOD FOR ADJUSTING EXPOSURE PARAMETERS OF IMAGES TO BE SPLICED AND IMAGE ANALYZING DEVICE

CROSS-REFERENCE TO RELATED APPLICATION

This application claims the priority benefit of Taiwan application serial no. 113116116, filed on Apr. 30, 2024. The entirety of the above-mentioned patent application is hereby incorporated by reference herein and made a part of this specification.

BACKGROUND

Technical Field

The disclosure relates to a mechanism for adjusting exposure parameters, and in particular to a method for adjusting exposure parameters of images to be spliced and an image analyzing device.

Description of Related Art

In the prior art, there is a technology in which multiple images are simultaneously captured with different lenses, and the images are then spliced into a panoramic image.

As the panoramic image technology gradually matures, the panoramic image technology has been widely applied to many fields such as video conferencing, video surveillance, virtual reality, robot navigation, and smart factories. The basic principle of the panoramic image technology is to find similar overlapping areas in multiple images to be spliced, and splice the images to be spliced into a complete panoramic image. However, if there is a significant difference in scene brightness between two or more images, there will be a negative impact, such as uneven brightness in the spliced overlapping areas, on the splicing quality of the panoramic image, thereby reducing the overall quality of the image.

For example, if exposure parameters (for example, exposure time and/or gain) used by the above lenses when capturing the images are not properly adjusted, the obtained panoramic image may have a splicing line at the splicing point due to uneven brightness of the images, thereby affecting the quality of the panoramic image.

SUMMARY

The disclosure provides a method for adjusting exposure parameters of images to be spliced and an image analyzing device, which can be used to solve the above technical issues.

An embodiment of the disclosure provides a method for adjusting exposure parameters of images to be spliced, which is adapted to an image analyzing device. The method includes the following steps. N images to be spliced into a panoramic image are obtained. Each of the N images includes a first overlapping area and a second overlapping area, and N is an integer greater than 1. A first brightness value of the first overlapping area and a second brightness value of the second overlapping area of each of the N images are obtained, and a first brightness ratio value and a second brightness ratio value of each of the N images are accordingly determined. A brightness ratio difference of each of the N images is determined based on the first brightness ratio value and the second brightness ratio value of each of the N images, and an exposure parameter corresponding to each of the N images is accordingly updated.

An embodiment of the disclosure provides an image analyzing device, which includes a storage circuit and a processor. The storage circuit stores a program code. The processor is coupled to the storage circuit and accesses the program code to execute the following operations. N images to be spliced into a panoramic image are obtained. Each of the N images includes a first overlapping area and a second overlapping area, and N is an integer greater than 1. A first brightness value of the first overlapping area and a second brightness value of the second overlapping area of each of the N images are obtained, and a first brightness ratio value and a second brightness ratio value of each of the N images are accordingly determined. A brightness ratio difference of each of the N images is determined based on the first brightness ratio value and the second brightness ratio value of each of the N images, and an exposure parameter corresponding to each of the N images is accordingly updated.

DESCRIPTION OF THE EMBODIMENTS

Figure 1:
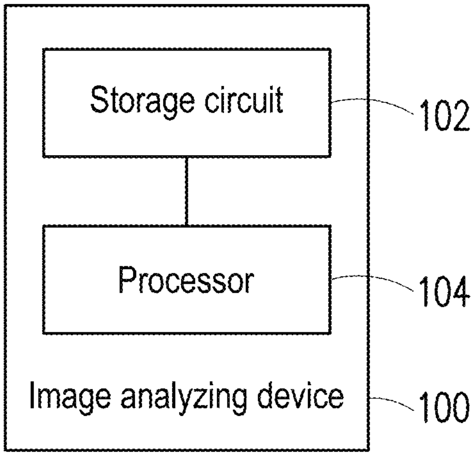
FIG. 1 is a schematic diagram of an image analyzing device according to an embodiment of the disclosure.

Please refer to FIG. 1, which is a schematic diagram of an image analyzing device according to an embodiment of the disclosure. In different embodiments, an image analyzing device 100 may be, for example, implemented as various smart devices and/or computer devices, but not limited thereto.

In FIG. 1, the image analyzing device 100 includes a storage circuit 102 and a processor 104. The storage circuit 102 is, for example, any type of fixed or removable random access memory RAM), read-only memory (ROM), flash memory, hard drive, other similar device, or a combination of the devices and may be used to record multiple program codes or modules.

The processor 104 is coupled to the storage circuit 102 and may be a general purpose processor, a specific purpose processor, a traditional processor, a digital signal processor, multiple microprocessors, one or more microprocessors combined with a digital signal processor core, a controller, a microcontrollers, an application specific integrated circuit (ASIC), a field programmable gate array (FPGA), various other integrated circuits, a state machine, a processor based on an advanced reduced instruction set computer (RISC) machine (ARM), and so on.

In an embodiment of the disclosure, the processor 104 may access the modules and the program codes recorded in the storage circuit 102 to implement a method for adjusting exposure parameters of images to be spliced of the disclosure, and the details thereof are described below.

Figure 2:
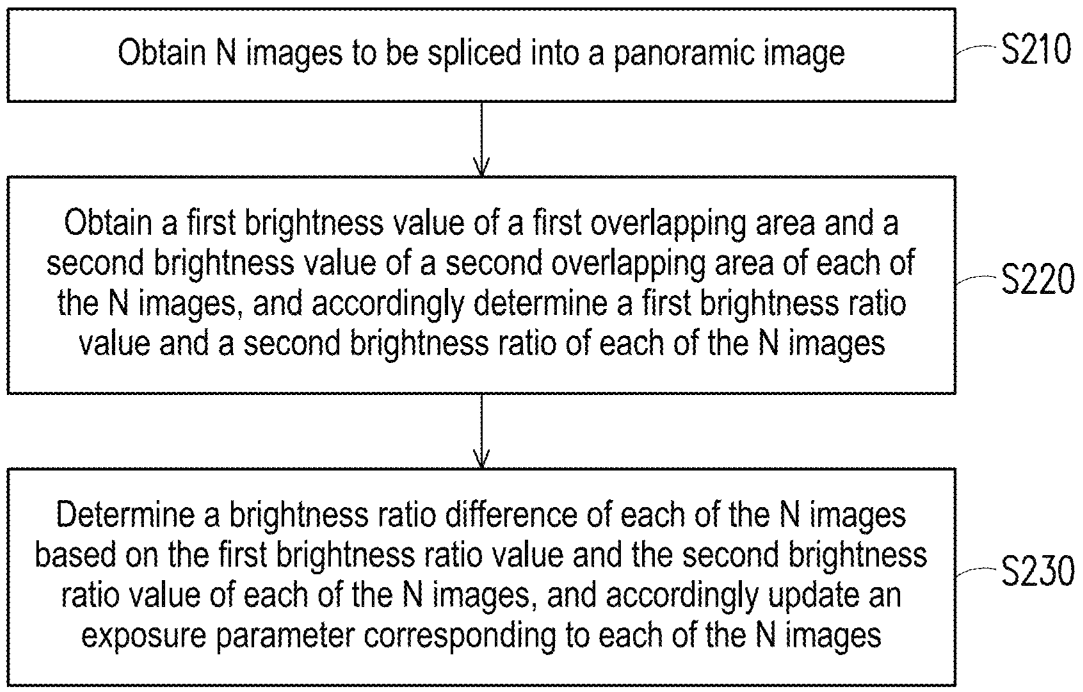
FIG. 2 is a flowchart of a method for adjusting exposure parameters of images to be spliced according to an embodiment of the disclosure.

Please refer to FIG. 2, which is a flowchart of a method for adjusting exposure parameters of images to be spliced according to an embodiment of the disclosure. The method of the embodiment may be executed by the image analyzing device 100 of FIG. 1. The details of each step of FIG. 2 will be described below with reference to the elements shown in FIG. 1.

First, in step S210, the processor 104 obtains N images to be spliced into a panoramic image, wherein each of the N images includes a first overlapping area and a second overlapping area, and N is an integer greater than 1.

Figure 3:
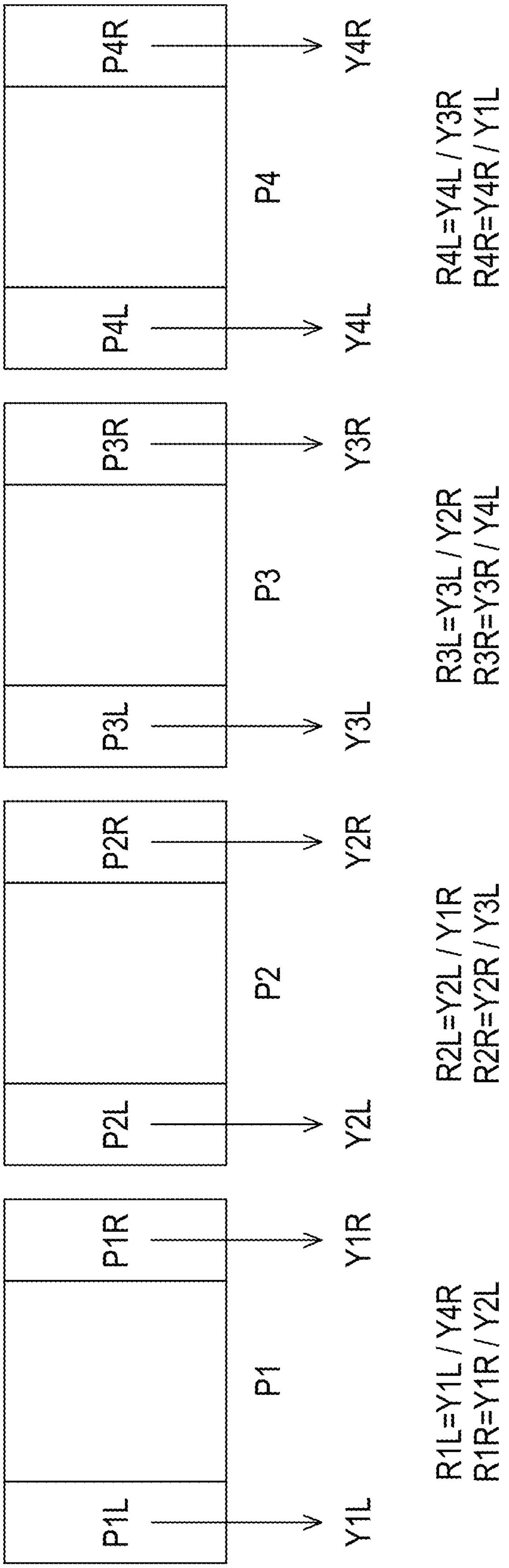
FIG. 3 is an application scenario diagram according to an embodiment of the disclosure.

In order for the concept of the disclosure to be easier to understand, the following is supplemented by FIG. 3 for illustration, wherein FIG. 3 is an application scenario diagram according to an embodiment of the disclosure.

In the scenario of FIG. 3, N is, for example, 4, and images P1 to P4 are, for example, the N images under consideration to be spliced into the panoramic image in step S210, but not limited thereto.

In the embodiment, each of the images P1 to P4 includes a corresponding first overlapping area and second overlapping area. For example, the image P1 includes a first overlapping area P1L and a second overlapping area P1R, the image P2 includes a first overlapping area P2L and a second overlapping area P2R, the image P3 includes a first overlapping area P3L and a second overlapping area P3R, the image P3 includes a first overlapping area P3L and a second overlapping area P3R, and the image P4 includes a first overlapping area P4L and a second overlapping area P4R.

In FIG. 3, when 1≤i≤N−1, the second overlapping area of the $i^{th}$ image among the N images corresponds to the first overlapping area of the $(i+1)^{th}$ image among the N images, where i is an index value.

For example, when i is 1, the second overlapping area P1R of the image P1 (for example, the $1^{st}$ image among the N images) corresponds to the first overlapping area P2L of the image P2 (for example, the $2^{nd}$ image among the N images). In this case, when the images P1 and P2 are used to be spliced to form a part of the panoramic image, the second overlapping area P1R is used to overlap with the corresponding first overlapping area P2L, thereby completing the operation of splicing the images P1 and P2.

For another example, when i is 2, the second overlapping area P2R of the image P2 (for example, the $2^{nd}$ image among the N images) corresponds to the first overlapping area P3L of the image P3 (for example, the $3^{rd}$ image among the N images). In this case, when the images P2 and P3 are used to be spliced to form a part of the panoramic image, the second overlapping area P2R is used to overlap with the corresponding first overlapping area P3L, thereby completing the operation of splicing the images P2 and P3.

In addition, when i is 3 (for example, N−1), the second overlapping area P3R of the image P3 (for example, the $3^{rd}$ image among the N images) corresponds to the first overlapping area P4L of the image P4 (for example, the $4^{th}$ image among the N images)). In this case, when the images P3 and P4 are used to be spliced to form a part of the panoramic image, the second overlapping area P3R is used to overlap with the corresponding first overlapping area P4L, thereby completing the operation of splicing the images P3 and P4.

In addition, when i=N, the second overlapping area of the $i^{th}$ image among the N images corresponds to the first overlapping area of the $1^{st}$ image among the N images.

For example, when i is 4 (for example, N), the second overlapping area P4R of the image P4 (for example, the $4^{th}$ image among the N images) corresponds to the first overlapping area P1L of the image P1 (for example, the $1^{st}$ image among the N images). In this case, when the images P4 and P1 are used to be spliced to form a part of the panoramic image, the second overlapping area P4R is used to overlap with the corresponding first overlapping area P1L, thereby completing the operation of splicing the images P4 and P1.

In an embodiment, the images P1 to P4 may be spliced into the panoramic image based on the above principle. In some embodiments, the panoramic image may also be referred to as a 360 panorama, but not limited thereto.

In an embodiment, the N images are, for example, captured by N different lenses (hereinafter referred to as C1 to CN) with corresponding exposure parameters (for example, exposure time and/or exposure gain, etc.) at the same time point. For example, the images P1 to P4 are respectively captured by lenses C1 to C4 with corresponding exposure parameters (for example, exposure time and/or exposure gain, etc.) at the same time point, but not limited thereto.

For ease of explanation, it is assumed below that the N images are captured at the $t^{th}$ time point (where t is a time index), and the N images may be, for example, correspondingly expressed as P1[t] to PN[t]. In the scenario of FIG. 3, the images P1 to P4 are, for example, P1[t] to P4[t], but not limited thereto.

In some embodiments, the N lenses may be, for example, included in the image analyzing device 100 or externally connected to the image analyzing device 100, but not limited thereto.

In an embodiment, the processor 104 may continue to execute step S220 after executing step S210.

In another embodiment, after the processor 104 executes step S210, other operations may also be performed first. For example, the processor 104 may first determine whether a brightness difference absolute value between a brightness (for example, a total average brightness) of one or more of the images P1 to P4 and a target brightness is greater than a preset threshold. If yes, the processor 104 may, for example, adjust the exposure parameters used by one or more of the N lenses based on a conventional automatic exposure adjustment mechanism (for example, Chinese Patent Publication No. CN101064783A and/or CN1504823A), and accordingly capture other images to be spliced in the future.

On the other hand, if the brightness difference absolute value between the brightness (for example, the total average brightness) of one or more of the images P1 to P4 and the target brightness is not greater than the preset threshold, the processor 104 may continue to execute steps S220 and S230.

From another point of view, if the brightness difference absolute value between the brightness (for example, an average brightness) of one or more of the images P1 to P4 and the target brightness is greater than the preset threshold, the processor 104 may roughly adjust the exposure parameters used by one or more of the N lenses through the conventional automatic exposure adjustment mechanism. On the other hand, if the brightness difference absolute value between the brightness (for example, the average brightness) of one or more of the images P1 to P4 and the target brightness is not greater than the preset threshold, the processor 104 may finely adjust the exposure parameters used by one or more of the N lenses through steps S220 and S230, but not limited thereto.

In step S220, the processor 104 obtains a first brightness value of the first overlapping area and a second brightness value of the second overlapping area of each of the N images, and accordingly determines a first brightness ratio value and a second brightness ratio of each of the N images.

In the embodiment of the disclosure, the first brightness value of the first overlapping area is, for example, an average brightness value of pixels located in the first overlapping area under consideration, and the second brightness value of the second overlapping area is, for example, an average brightness value of pixels located in the second overlapping area under consideration, but not limited thereto.

For example, for the first overlapping area P1L, the corresponding first brightness value is, for example, the average brightness value of the pixels located in the first overlapping area P1L. For another example, for the second overlapping area P1R, the corresponding second brightness value is, for example, the average brightness value of the pixels located in the second overlapping area P1R. The first/second brightness values corresponding to the remaining first/second overlapping areas may be deduced according to the above principle, which will not be elaborated here.

In an embodiment, when 2≤i≤N−1, the processor 104 may determine the first brightness ratio value of the $i^{th}$ image based on the first brightness value of the first overlapping area of the $i^{th}$ image among the N images and the second brightness value of the second overlapping area of the $(i-1)^{th}$ image among the N images, and determine the second brightness ratio value of the $i^{th}$ image based on the second brightness value of the second overlapping area of the $i^{th}$ image and the first brightness value of the first overlapping area of the $(i+1)^{th}$ image among the N images.

Taking FIG. 3 as an example, when i=2, the processor 104 may determine a first brightness ratio value R2L of the image P2 based on a first brightness value Y2L of the first overlapping area P2L of the image P2 (that is, the $2^{nd}$ image among the N images) and a second brightness value Y1R of the second overlapping area P1R of the image P1 (that is, the $1^{st}$ image among the N images). In an embodiment, the first brightness ratio value R2L of the image P2 may be, for example, expressed as "R2L=Y2L/Y1R", but not limited thereto.

In addition, the processor 104 may also determine a second brightness ratio value R2R of the image P2 based on a second brightness value Y2R of the second overlapping area P2R of the image P2 and a first brightness value Y3L of the first overlapping area P3L of the image P3 (that is, the $3^{rd}$ image among the N images). In an embodiment, the second brightness ratio value R2R of the image P2 may be, for example, expressed as "R2R=Y2R/Y3L", but not limited thereto.

Taking FIG. 3 as an example again, when i=3, the processor 104 may determine a first brightness ratio value R3L of the image P3 based on the first brightness value Y3L of the first overlapping area P3L of the image P3 (that is, the $3^{rd}$ image among the N images) and the second brightness value Y2R of the second overlapping area P2R of the image P2 (that is, the $2^{nd}$ image among the N images). In an embodiment, the first brightness ratio value R3L of the image P3 may be, for example, expressed as "R3L=Y3L/Y2R", but not limited thereto.

In addition, the processor 104 may also determine a second brightness ratio value R3R of the image P3 based on a second brightness value Y3R of the second overlapping area P3R of the image P3 and a first brightness value Y4L of the first overlapping area P4L of the image P4 (that is, the $4^{th}$ image among the N images). In an embodiment, the second brightness ratio value R3R of the image P3 may be, for example, expressed as "R3R=Y3R/Y4L", but not limited thereto.

In an embodiment, when i=1, the processor 104 may determine the first brightness ratio value of the $i^{th}$ image based on the first brightness value of the first overlapping area of the $i^{th}$ image among the N images and the second brightness value of the second overlapping area of the $N^{th}$ image among the N images, and determine the second brightness ratio value of the $i^{th}$ image based on the second brightness value of the second overlapping area of the $i^{th}$ image and the first brightness value of the first overlapping area of the $(i+1)^{th}$ image among the N images.

Taking FIG. 3 as an example, when i=1, the processor 104 may determine a first brightness ratio value R1L of the image P1 based on a first brightness value Y1L of the first overlapping area P1L of the image P1 (that is, the $1^{st}$ image among the N images) and a second brightness value Y4R of the second overlapping area P4R of the image P4 (that is, the $N^{th}$ image among the N images). In an embodiment, the first brightness ratio value R1L of the image P1 may be, for example, expressed as "R1L=Y1L/Y4R", but not limited thereto.

In addition, the processor 104 may also determine a second brightness ratio value R1R of the image P1 based on the second brightness value Y1R of the second overlapping area P1R of the image P1 and the first brightness value Y2L of the first overlapping area P2L of the image P2 (that is, the $2^{nd}$ image among the N images). In an embodiment, the second brightness ratio value R1R of the image P1 may be, for example, expressed as "R1R=Y1R/Y2L", but not limited thereto.

In yet another embodiment, when i=N, the processor 104 may determine the first brightness ratio value of the $i^{th}$ image based on the first brightness value of the first overlapping area of the $N^{th}$ image among the N images and the second brightness value of the second overlapping area of the $(i-1)^{th}$ image among the N images, and determine the second brightness ratio value of the $i^{th}$ image based on the second brightness value of the second overlapping area of the $N^{th}$ image and the first brightness value of the first overlapping area of the $1^{st}$ image among the N images.

In FIG. 3, when i=4, the processor 104 may determine a first brightness ratio value R4L of the image P4 based on the first brightness value Y4L of the first overlapping area P4L of the image P4 (that is, the $4^{th}$ image among the N images) and the second brightness value Y3R of the second overlapping area P3R of the image P3 (that is, the $3^{rd}$ image among the N images). In an embodiment, the first brightness ratio value R4L of the image P4 may be, for example, expressed as "R4L=Y4L/Y3R", but not limited thereto.

In addition, the processor 104 may also determine a second brightness ratio value R4R of the image P4 based on the second brightness value Y4R of the second overlapping area P4R of the image P4 and the first brightness value Y1L of the first overlapping area P1L of the image P1 (that is, the $1^{st}$ image among the N images). In an embodiment, the second brightness ratio value R4R of the image P4 may be, for example, expressed as "R4R=Y4R/Y1L", but not limited thereto.

In step S230, the processor 104 determines a brightness ratio difference of each of the N images based on the first brightness ratio value and the second brightness ratio value of each of the N images, and accordingly updates the exposure parameter corresponding to each of the N images.

In an embodiment, the brightness ratio difference of the $i^{th}$ image among the N images may be, for example, characterized as $RatioD_i$. In an embodiment, $RatioD_i=|RatioY_i-1|$, where $RatioY_i=(RatioMeanP_i+RatioMaxP_i)/2$, $RatioMaxP_i=MAX(RiL, RiR)$, and $RatioMeanP_i=(RiL+RiR)/2$. RiL is the first brightness ratio value of the $i^{th}$ image and RiR is the second brightness ratio value of the $i^{th}$ image, where i is an index value.

For example, when i=1, $RatioD_1=|RatioY_1-1|$, wherein $RatioY_1=(RatioMeanP_1+RatioMaxP_1)/2$, $RatioMaxP_1$=MAX(R1L, R1R), and $RatioMeanP_1$=(R1L+R1R)/2. For another example, when i=2, $RatioD_2$=|$RatioY_2$−1|, wherein $RatioY_2$=($RatioMeanP_2$+$RatioMaxP_2$)/2, $RatioMaxP_2$=MAX(R2L, R2R), and $RatioMeanP_2$=(R2L+R2R)/2. In other embodiments, $RatioD_i$, $RatioY_i$, $RatioMaxP_i$, and $RatioMeanP_i$ corresponding to other i values may be deduced according to the above principle, which will not be elaborated here.

Figure 4:
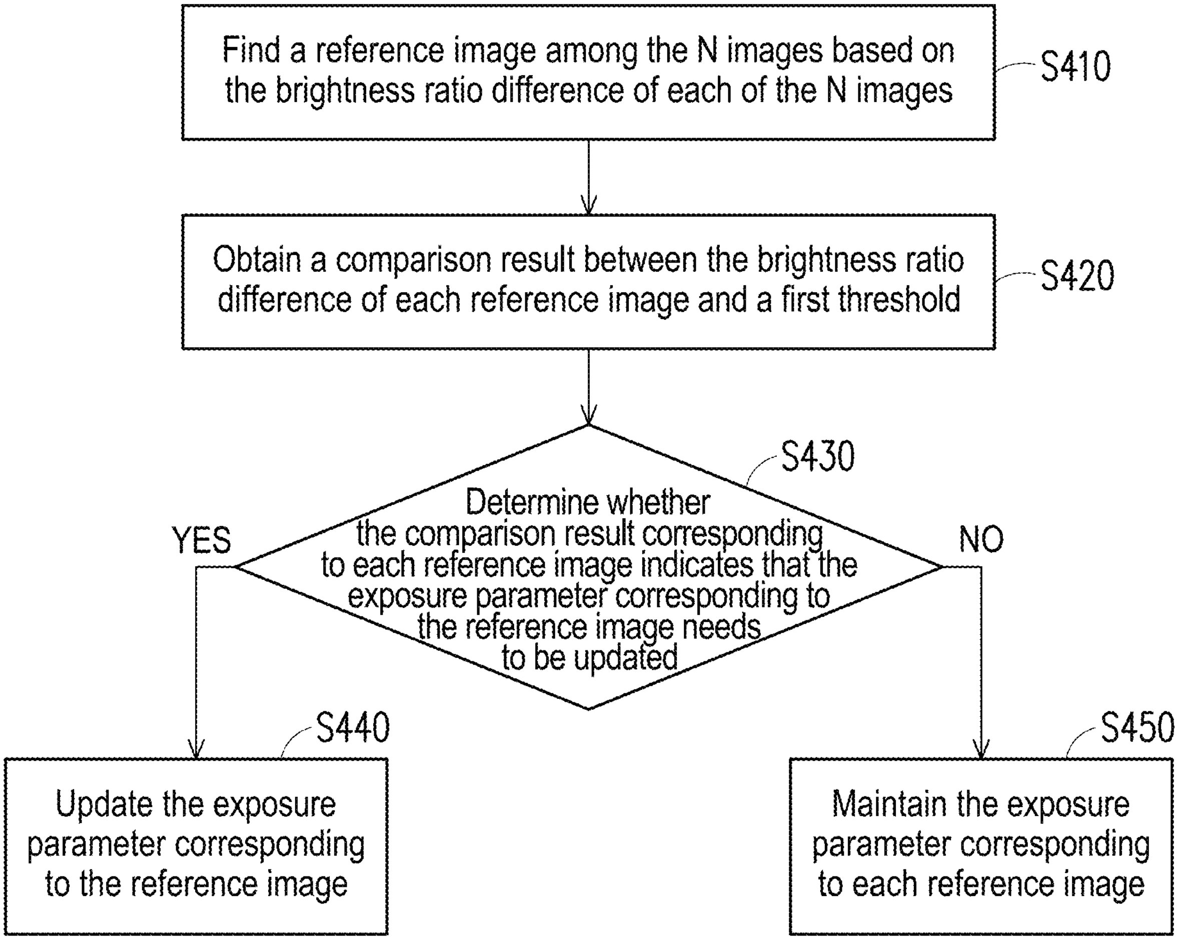
FIG. 4 is a flowchart of updating an exposure parameter according to an embodiment of the disclosure.

In an embodiment, the processor 104 may, for example, execute the process of FIG. 4 to update the corresponding exposure parameters based on the respective brightness ratio values of the N images.

Please refer to FIG. 4, which is a flowchart of updating an exposure parameter according to an embodiment of the disclosure.

In step S410, the processor 104 finds a reference image among the N images based on the brightness ratio difference of each of the N images.

In an embodiment, the processor 104 may find an image corresponding to the maximum brightness ratio difference among the N images as the reference image under consideration.

For example, if the brightness ratio difference (that is, $RatioD_1$) corresponding to the image P1 is greater than the brightness ratio differences (that is, $RatioD_2$ to $RatioD_4$) corresponding to the images P2 to P4, the processor 104 may determine that the image P1 is the reference image under consideration, but not limited thereto.

In another embodiment, when the processor 104 executes step S410, one or more images with corresponding brightness ratio differences greater than a third threshold may also be found among the N images as the reference image under consideration. For example, if only $RatioD_1$ and $RatioD_2$ among $RatioD_1$ to $RatioD_4$ are greater than the third threshold, the processor 104 may determine that the images P1 and P2 are the reference images under consideration. Afterwards, the processor 104 may continue to execute steps S420 to S450 based on the determined reference image, but not limited thereto.

In step S420, the processor 104 obtains a comparison result between the brightness ratio difference of each reference image and a first threshold, and determines whether the comparison result corresponding to each reference image indicates that the exposure parameter corresponding to the reference image needs to be updated in step S430. In different embodiments, the value of the first threshold may be set to a required value according to the requirements of the designer.

In an embodiment, in response to determining that the brightness ratio difference of one of the reference images (hereinafter referred to as a first reference image) is greater than the first threshold, the processor 104 may determine that the comparison result corresponding to the first reference image indicates that the exposure parameter corresponding to the first reference image needs to be updated. On the other hand, in response to determining that the brightness ratio difference of the first reference image is not greater than the first threshold, the processor 104 may determine that the comparison result corresponding to the first reference image indicates that the exposure parameter corresponding to the first reference image does not need to be updated, but not limited thereto.

For example, in the embodiment where the image P1 is assumed to be the reference image, if the processor 104 determines that the brightness ratio difference (that is, $RatioD_1$) corresponding to the image P1 is greater than the first threshold, the processor 104 may determine that the comparison result corresponding to the image P1 indicates that the exposure parameter corresponding to the image P1 (for example, the exposure parameter of the lens C1) needs to be updated. On the other hand, if the processor 104 determines that the brightness ratio difference (that is, $RatioD_1$) corresponding to the image P1 is not greater than the first threshold, the processor 104 may determine that the comparison result corresponding to the image P1 indicates that the exposure parameter corresponding to the image P1 does not need to be updated.

For another example, in the embodiment where the image P2 is assumed to be the reference image, if the processor 104 determines that the brightness ratio difference (that is, $RatioD_2$) corresponding to the image P2 is greater than the first threshold, the processor 104 may determine that the comparison result corresponding to the image P2 indicates that the exposure parameter corresponding to the image P2 (for example, the exposure parameter of the lens C2) needs to be updated. On the other hand, if the processor 204 determines that the brightness ratio difference (that is, $RatioD_2$) corresponding to the image P2 is not greater than the first threshold, the processor 204 may determine that the comparison result corresponding to the image P2 indicates that the exposure parameter corresponding to the image P2 does not need to be updated.

In an embodiment, in response to determining that the comparison result corresponding to each reference image indicates that the exposure parameter corresponding to the reference image needs to be updated, the processor 104 may update the exposure parameter corresponding to the reference image in step S440. For example, in the embodiment where the image P1 is assumed to be the reference image, if the processor 104 determines that the comparison result corresponding to the image P1 indicates that the exposure parameter corresponding to the image P1 needs to be updated, the processor 104 may update the exposure parameter corresponding to the image P1 (for example, the exposure parameter of the lens C1) in step S440. For another example, in the embodiment where the image P2 is assumed to be the reference image, if the processor 104 determines that the comparison result corresponding to the image P2 indicates that the exposure parameter corresponding to the image P2 needs to be updated, the processor 104 may update the exposure parameter corresponding to the image P2 (for example, the exposure parameter of the lens C2) in step S440.

Figure 5:
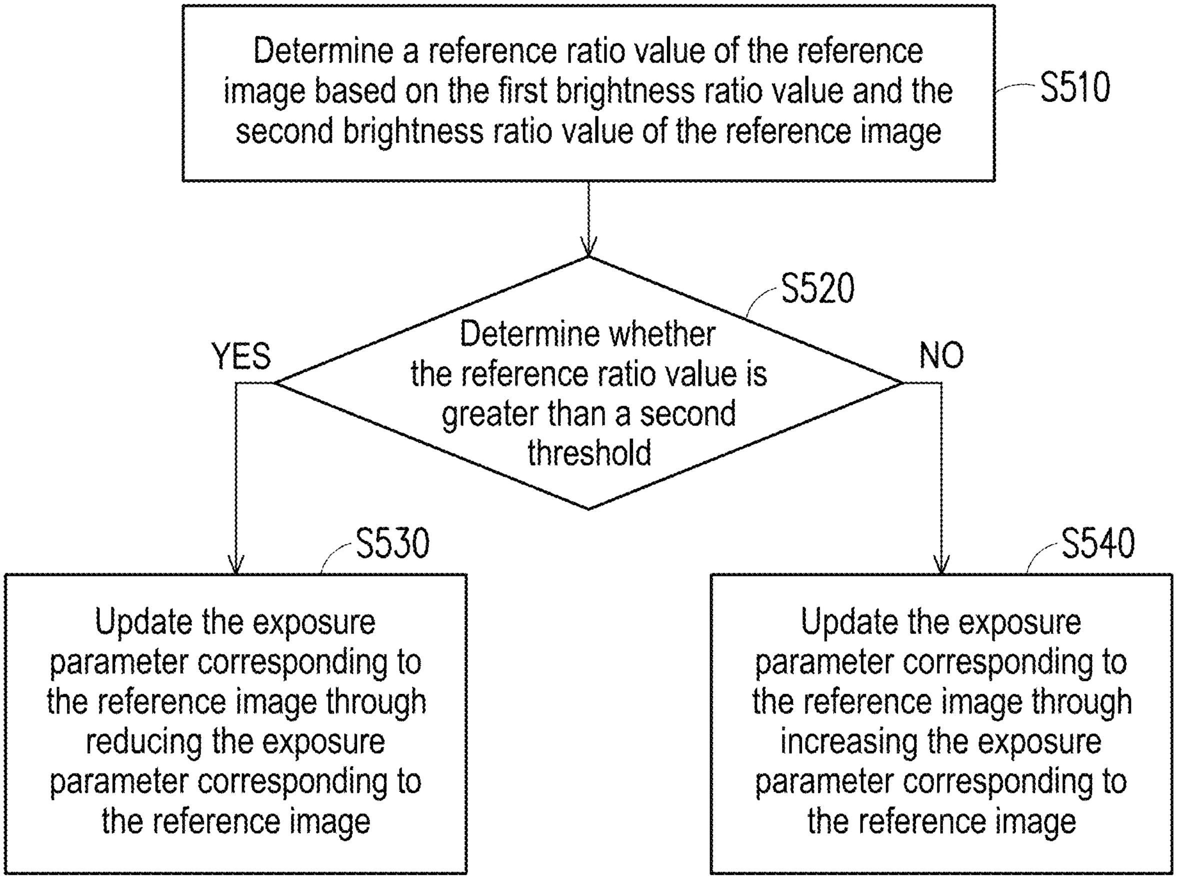
FIG. 5 is a flowchart of updating an exposure parameter corresponding to a reference image according to FIG. 4.

In an embodiment, the processor 104 may, for example, execute step S440 based on the content of FIG. 5. Please refer to FIG. 5, which is a flowchart of updating an exposure parameter corresponding to a reference image according to FIG. 4.

In step S510, the processor 104 may determine a reference ratio value of the reference image based on the first brightness ratio value and the second brightness ratio value of the reference image.

In the embodiment of the disclosure, the reference ratio value is, for example, $RatioY_i$ mentioned in the previous embodiment, and reference may be made to the previous description for the relevant calculation method thereof, which will not be elaborated here. In this case, if the reference image under consideration is the image P1, the processor 104 may use $RatioY_1$ as the reference ratio value under consideration in step S510. On the other hand, if the reference image under consideration is the image P2, the processor 104 may use $RatioY_2$ as the reference ratio value under consideration in step S510, but not limited thereto.

Next, in step S520, the processor 104 may determine whether the reference ratio value is greater than a second threshold. In different embodiments, the second threshold may be set to a required value, such as 0.02, according to the requirements of the designer, but not limited thereto.

In an embodiment, in response to determining that the reference ratio value is greater than the second threshold, the processor 104 may update the exposure parameter corresponding to the reference image through reducing the exposure parameter corresponding to the reference image in step S530.

In an embodiment, it is assumed that the original exposure parameter corresponding to the reference image is g, and the updated exposure parameter is g'. In this case, the processor 104 may, for example, determine g' in step S530 based on the relational expression "$g'=g-\alpha*f(RatioD_i)$".

For example, in the embodiment where the reference image is assumed to be the image P1, the processor 104 may determine g' in step S530 based on the relational expression "$g'=g-\alpha*f(RatioD_1)$". For another example, in the embodiment where the reference image is assumed to be the image P2, the processor 104 may determine g' in step S530 based on the relational expression "$g'=g-\alpha*f(RatioD_2)$", but not limited thereto.

On the other hand, in response to determining that the reference ratio value is not greater than the second threshold, the processor 104 may update the exposure parameter corresponding to the reference image through increasing the exposure parameter corresponding to the reference image in step S540.

In an embodiment, the processor 104 may, for example, determine g' in step S540 based on the relational expression "$g'=g+\alpha*f(RatioD_i)$".

For example, in the embodiment where the reference image is assumed to be the image P1, the processor 104 may determine g' (for example, the updated exposure parameter of the lens C1) in step S540 based on the relational expression "$g'=g+\alpha*f(RatioD_1)$". As another example, in the embodiment where the reference image is assumed to be the image P2, the processor 104 may determine g' (for example, the updated exposure parameter of the lens C2) in step S540 based on the relational expression "$g'=g+\alpha*f(RatioD_2)$", but not limited thereto.

In the embodiment of the disclosure, the above "$\alpha*f(RatioD_i)$" may be understood as the amplitude of increase/decrease of the processor 104 when updating the exposure parameter or the step size for converging the exposure parameter. In an embodiment, α is a constant parameter (for example, 1) self-defined by a user, f(•) is a non-decreasing real number function (for example, an adaptive parameter that may change according to the size of $RatioD_i$), and the two may both control the convergence speed, but not limited thereto.

In an embodiment, f(•) may be characterized by the following formulae:

$$f(\cdot) = RatioD_i/8, \text{ if } RatioD_i < 0.2$$
$$RatioD_i/2, \text{ if } RatioD_i \geq 0.2.$$

Please refer to FIG. 4 again. In response to the processor 104 determining that the comparison result corresponding to each reference image indicates that the exposure parameter corresponding to the reference image does not need to be updated in step S430, the processor 104 may continue to maintain the exposure parameter corresponding to each reference image in step S450. For example, in the embodiment where the image P1 is assumed to be the reference image, if the processor 104 determines that the comparison result corresponding to the image P1 indicates that the exposure parameter corresponding to the image P1 does not need to be updated, the processor 104 may maintain the exposure parameter corresponding to the image P1 (for example, the exposure parameter of the lens C1) in step S450. For another example, in the embodiment where the image P2 is assumed to be the reference image, if the processor 104 determines that the comparison result corresponding to the image P2 indicates that the exposure parameter corresponding to the image P2 does not need to be updated, the processor 104 may maintain the exposure parameter corresponding to the image P2 (for example, the exposure parameter of the lens C2) in step S450.

In addition, in the embodiment of the disclosure, if the processor 104 finds multiple reference images in step S410, the processor 104 may still update/maintain the exposure parameter corresponding to each reference image based on the above mechanism, but not limited thereto.

Please refer to FIG. 2 again. After executing step S230 to update the exposure parameter corresponding to each of the N images (for example, the exposure parameter corresponding to the reference image), the processor 104 may capture N new images (which may be expressed as P1[t+k] to PN[t+k]) corresponding to the $(t+k)^{th}$ time point with the exposure parameters corresponding to the N images, where k is a positive integer (for example, 1).

For example, in the case where k is assumed to be 1 and N is 4, the processor 104 may update the exposure parameters corresponding to one or more of the images P1 to P4 (that is, P1[t] to P4[t]) (for example, the exposure parameters of one or more of the lenses C1 to C4) in step S230, and then capture 4 new images (that is, P1[t+1] to P4[t+1]) corresponding to the $(t+1)^{th}$ time point with the lenses C1 to C4 having the updated exposure parameters, but not limited thereto.

In an embodiment, the processor 104 may then regard P1[t+1] to P4[t+1] as the N images under consideration in step S210 again, and accordingly execute steps S220 and S230. In this way, the exposure parameters corresponding to one or more of the lenses C1 to C4 may be continuously updated over time, so that the overlapping areas in the images to be spliced captured by the lenses C1 to C4 have a lower brightness difference. In this way, when the images to be spliced captured by the lenses C1 to C4 are spliced into the panoramic image, in addition to improving the overall visual effect due to the improvement of the image quality, greater convenience is also provided for subsequent applications.

It should be understood that although the above embodiments all use N=4 as an example, in other embodiments, N may be adjusted to a required value according to the requirements of the designer, and persons with ordinary knowledge in the art should be able to correspondingly deduce corresponding implementations when N is other values according to the contents of the above embodiments.

In summary, the method according to the embodiments of the disclosure may perform brightness statistics according to the overlapping areas of the images to be spliced, and adaptively update the exposure parameter corresponding to each image to be spliced (for example, the exposure parameter corresponding to the lens) according to the statistical results. In this way, the image brightness may be adaptively adjusted, thereby reducing the brightness difference in the image overlapping areas to improve the image splicing quality, which not only improves the overall visual effect of the panoramic image, but also provides greater convenience for subsequent applications.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A method for adjusting exposure parameters of images to be spliced, adapted to an image analyzing device, comprising:

obtaining N images to be spliced into a panoramic image, wherein each of the N images comprises a first overlapping area and a second overlapping area, and N is an integer greater than 1;

obtaining a first brightness value of the first overlapping area and a second brightness value of the second overlapping area of each of the N images, and accordingly determining a first brightness ratio value and a second brightness ratio value of each of the N images; and determining a brightness ratio difference of each of the N images based on the first brightness ratio value and the second brightness ratio value of each of the N images, and accordingly updating an exposure parameter corresponding to each of the N images.

2. The method according to claim 1, further comprising: splicing the N images into the panoramic image.

3. The method according to claim 1, wherein when $1 \leq i \leq N-1$, the second overlapping area of an $i^{th}$ image among the N images corresponds to the first overlapping area of an $(i+1)^{th}$ image among the N images, where i is an index value;

when i=N, the second overlapping area of the $i^{th}$ image among the N images corresponds to the first overlapping area of a $1^{st}$ image among the N images.

4. The method according to claim 1, wherein the N images correspond to a $t^{th}$ time point, and after updating the exposure parameter corresponding to each of the N images, the method further comprises:

capturing N new images corresponding to a $(t+k)^{th}$ time point with the exposure parameters corresponding to the N images, where t is a time index and k is a positive integer.

5. The method according to claim 1, wherein determining the first brightness ratio value and the second brightness ratio value of each of the N images comprises:

when $2 \leq i \leq N-1$, determining the first brightness ratio value of an $i^{th}$ image among the N images based on the first brightness value of the first overlapping area of the $i^{th}$ image and the second brightness value of the second overlapping area of an $(i-1)^{th}$ image among the N images, and determining the second brightness ratio value of the $i^{th}$ image based on the second brightness value of the second overlapping area of the $i^{th}$ image and the first brightness value of the first overlapping area of an $(i+1)^{th}$ image among the N images, where i is an index value.

6. The method according to claim 1, wherein determining the first brightness ratio value and the second brightness ratio value of each of the N images comprises:

when i=1, determining the first brightness ratio value of an $i^{th}$ image among the N images based on the first brightness value of the first overlapping area of the $i^{th}$ image and the second brightness value of the second overlapping area of an $N^{th}$ image among the N images, and determining the second brightness ratio value of the $i^{th}$ image based on the second brightness value of the second overlapping area of the $i^{th}$ image and the first brightness value of the first overlapping area of an $(i+1)^{th}$ image among the N images;

when i=N, determining the first brightness ratio value of the $i^{th}$ image based on the first brightness value of the first overlapping area of the $N^{th}$ image among the N images and the second brightness value of the second overlapping area of an $(i-1)^{th}$ image among the N images, and determining the second brightness ratio value of the $i^{th}$ image based on the second brightness value of the second overlapping area of the $N^{th}$ image and the first brightness value of the first overlapping area of a $1^{st}$ image among the N images.

7. The method according to claim 1, wherein the brightness ratio difference of an $i^{th}$ image among the N images is characterized as $RatioD_i$, wherein:

$$RatioD_i = |RatioY_i - 1|;$$

$$RatioY_i = (RatioMeanP_i + RatioMaxP_i)/2;$$

$$RatioMaxP_i = \mathrm{MAX}(RiL, RiR);$$

$$RatioMeanP_i = (RiL + RiR)/2,$$

wherein RiL is the first brightness ratio value of the $i^{th}$ image and RiR is the second brightness ratio value of the $i^{th}$ image, where i is an index value.

8. The method according to claim 1, wherein updating the exposure parameter corresponding to each of the N images comprises:

finding at least one reference image among the N images based on the brightness ratio difference of each of the N images;

obtaining a comparison result between a brightness ratio difference of each of the at least one reference image and a first threshold;

in response to determining that the comparison result corresponding to each of the at least one reference image indicates that an exposure parameter corresponding to the at least one reference image needs to be updated, updating the exposure parameter corresponding to the at least one reference image;

in response to determining that the comparison result corresponding to each of the at least one reference image indicates that the exposure parameter corresponding to the at least one reference image does not need to be updated, maintaining the exposure parameter corresponding to each of the at least one reference image.

9. The method according to claim 8, wherein the at least one reference image only comprises one reference image, and the brightness ratio difference of the one reference image is the largest among the N images, wherein updating the exposure parameter corresponding to the at least one reference image comprises:

determining a reference ratio value of the one reference image based on the first brightness ratio value and the second brightness ratio value of the one reference image;

in response to determining that the reference ratio value is greater than a second threshold, updating the exposure parameter corresponding to the one reference image through increasing the exposure parameter corresponding to the one reference image;

in response to determining that the reference ratio value is not greater than the second threshold, updating the exposure parameter corresponding to the one reference image through reducing the exposure parameter corresponding to the one reference image.

10. The method according to claim 8, further comprising:

in response to determining that the brightness ratio difference of one of the at least one reference image is greater than the first threshold, determining that the exposure parameter corresponding to the one of the at least one reference image needs to be updated.

11. The method according to claim 8, wherein the brightness ratio difference of each of the at least one reference image is greater than a third threshold.

12. An image analyzing device, comprising:

a non-transitory storage circuit, storing a program code; and a processor, coupled to the non-transitory storage circuit and accessing the program code to execute:

obtaining N images to be spliced into a panoramic image, wherein each of the N images comprises a first overlapping area and a second overlapping area, and N is an integer greater than 1;

obtaining a first brightness value of the first overlapping area and a second brightness value of the second overlapping area of each of the N images, and accordingly determining a first brightness ratio value and a second brightness ratio value of each of the N images; and determining a brightness ratio difference of each of the N images based on the first brightness ratio value and the second brightness ratio value of each of the N images, and accordingly updating an exposure parameter corresponding to each of the N images.

* * * * *